(12) United States Patent
Repice et al.

(10) Patent No.: US 11,407,287 B2
(45) Date of Patent: Aug. 9, 2022

(54) REFRIGERANT LEAK SENSOR PRE-TRIP SEQUENCE AND DIAGNOSTICS

(71) Applicant: Carrier Corporation, Palm Beach Gardens, FL (US)

(72) Inventors: Christopher G. Repice, Camillus, NY (US); Michael Stockbridge, Canastota, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 85 days.

(21) Appl. No.: 16/841,758

(22) Filed: Apr. 7, 2020

(65) Prior Publication Data

US 2020/0324624 A1 Oct. 15, 2020

Related U.S. Application Data

(60) Provisional application No. 62/832,411, filed on Apr. 11, 2019.

(51) Int. Cl.
*B60H 1/32* (2006.01)

(52) U.S. Cl.
CPC ......... *B60H 1/3225* (2013.01); *B60H 1/3205* (2013.01); *B60H 1/3232* (2013.01)

(58) Field of Classification Search
CPC ............ F25B 2500/22; F25B 2500/222; F25B 2600/05; B60H 1/3205; B60H 1/3225; B60H 1/3232; B60H 1/00978; B60H 1/00585; F24F 11/36
See application file for complete search history.

(56) References Cited

U.S. PATENT DOCUMENTS

| | | | |
|---|---|---|---|
| 4,663,725 A | 5/1987 | Truckenbrod et al. |
| 5,140,825 A | 8/1992 | Hanson et al. |
| 5,140,826 A | 8/1992 | Hanson et al. |
| 5,161,384 A | 11/1992 | Hanson et al. |

(Continued)

FOREIGN PATENT DOCUMENTS

| | | |
|---|---|---|
| EP | 3017981 B1 | 8/2018 |
| EP | 3722771 A1 | 10/2020 |

(Continued)

OTHER PUBLICATIONS

European Search Report; European Application No. 20169485.8; Filed: Apr. 14, 2020; Report dated: Sep. 8, 2020; 8 pages.

(Continued)

*Primary Examiner* — Marc E Norman
(74) *Attorney, Agent, or Firm* — Cantor Colburn LLP

(57) ABSTRACT

Embodiments are provided for a system configured to provide pre-trip sequence and diagnostics for refrigerant leak sensor. The system includes a sensor, a fan, and a controller. The controller is further configured to validate an operation of the sensor, operate the fan based at least in part on validating the operation of the sensor, and responsive to operating the fan, determine if a leak is present using the sensor. The controller is also configured to perform a refrigeration test, determine if a leak is present using the sensor, and provide an alarm based at least in part on determining the leak is present. Embodiments are also provided for a method for performing a pre-trip sequence and diagnostics for a leak sensor.

19 Claims, 4 Drawing Sheets

(56) References Cited

U.S. PATENT DOCUMENTS

| | | |
|---|---|---|
| 5,172,561 A | 12/1992 | Hanson et al. |
| 5,438,841 A | 8/1995 | Cahill-Obrien et al. |
| 6,067,805 A | 5/2000 | Porter et al. |
| 6,098,412 A | 8/2000 | Porter et al. |
| 6,176,095 B1 | 1/2001 | Porter |
| 6,205,798 B1 | 3/2001 | Porter et al. |
| 6,233,952 B1 | 5/2001 | Porter et al. |
| 6,701,722 B1 | 3/2004 | Seo et al. |
| 6,912,860 B2 * | 7/2005 | Zima ................ B60H 1/00978 62/129 |
| 9,305,407 B1 | 4/2016 | Walton et al. |
| 9,568,226 B2 * | 2/2017 | Schuster ............... F25B 49/005 |
| 2018/0247895 A1 | 12/2018 | Jonsson et al. |

FOREIGN PATENT DOCUMENTS

| | | | |
|---|---|---|---|
| WO | 2010007448 A1 | 1/2010 | |
| WO | WO-2017002213 A1 * | 1/2017 | ............. F24F 11/89 |
| WO | 2017109531 A1 | 6/2017 | |

OTHER PUBLICATIONS

European Search Report; European Application No. 20169485.8; Filed: Apr. 14, 2020; dated Sep. 8, 2020; 8 pages.

\* cited by examiner

REFRIGERANT LEAK SENSOR PRE-TRIP SEQUENCE AND DIAGNOSTICS

CROSS-REFERENCE TO RELATED APPLICATIONS

This application claims the benefit of U.S. patent application Ser. No. 62/832,411, filed Apr. 11, 2019, the content of which is incorporated by reference herein in its entirety.

BACKGROUND

The subject matter disclosed herein relates generally to transport refrigeration units, and more particularly to providing pre-trip and diagnostics for refrigerant leak sensor.

Transport refrigeration units are used to cool cargo in a trailer or cargo compartment. The transport refrigeration units can include various systems to provide the air conditioning within the system. The systems can include electrical generation systems having AC and DC components and refrigeration systems having compressors, condensers, and fans. In addition, these systems can be monitored using controllers and various types of sensors to regulate and ensure the proper operation of the system.

BRIEF DESCRIPTION

According to an embodiment, a system configured to provide pre-trip sequence and diagnostics for refrigerant leak sensor is shown. The system includes a sensor, a fan, and a controller. The controller is configured to validate an operation of the sensor, operate the fan based at least in part on validating the operation of the sensor, and responsive to operating the fan, determine if a leak is present using the sensor. The controller is also configured to perform a refrigeration test, determine if a leak is present using the sensor, and provide an alarm based at least in part on determining the leak is present.

In addition to one or more of the features described herein, or as an alternative, further embodiments include a refrigeration system, wherein the refrigeration system includes a compressor and a condenser.

In addition to one or more of the features described herein, or as an alternative, further embodiments include a controller that has a low charge diagnostics calculation module for calculating a state of the refrigeration system, wherein the controller receives measurements from other sensors in the refrigeration system.

In addition to one or more of the features described herein, or as an alternative, further embodiments include a refrigeration system that is a transport refrigeration unit.

In addition to one or more of the features described herein, or as an alternative, further embodiments include a refrigerant leak sensor.

According to an embodiment, a method for performing pre-trip sequence and diagnostics for a leak sensor is shown. The method includes validating an operation of a sensor, operating an evaporator fan based at least in part on validating the operation of the sensor, and responsive to operating the evaporator fan, determining if a leak is present using the sensor. The method also includes performing a refrigeration test of a refrigeration system, determining if a leak is present using the sensor, and providing an alarm based at least in part on determining the leak is present.

In addition to one or more of the features described herein, or as an alternative, further embodiments include sending, by the controller, a signal to the sensor and receiving a reading from the sensor.

In addition to one or more of the features described herein, or as an alternative, further embodiments include validating if the sensor fails and providing a sensor service alarm to indicate the sensor requires servicing.

In addition to one or more of the features described herein, or as an alternative, further embodiments include a refrigerant leak sensor.

In addition to one or more of the features described herein, or as an alternative, further embodiments include an evaporator fan that is operated prior to performing the refrigeration test.

In addition to one or more of the features described herein, or as an alternative, further embodiments include an evaporator fan that is operated with the refrigeration test.

In addition to one or more of the features described herein, or as an alternative, further embodiments include operating one or more components of the refrigeration system to test for component failures, and testing for a presence of a leak.

In addition to one or more of the features described herein, or as an alternative, further embodiments include initiating diagnostics for the sensor including calculating low charge diagnostics for the refrigeration system.

In addition to one or more of the features described herein, or as an alternative, further embodiments include comparing the low charge diagnostics calculations with the measured values from other sensors in the refrigeration system, and comparing results of the low charge diagnostics calculations with a state of the sensor.

In addition to one or more of the features described herein, or as an alternative, further embodiments include determining a potential false alarm exists based on comparing the low charge diagnostics calculations and measurements obtained from the sensor.

In addition to one or more of the features described herein, or as an alternative, further embodiments include providing a potential false alarm exists when the sensor indicates a sensor alarm and the low charge diagnostics calculations indicate the refrigeration system is operating within its operational limits.

In addition to one or more of the features described herein, or as an alternative, further embodiments include determining a faulty sensor exists when the sensor has not indicated a sensor alarm and the low charge diagnostics calculations indicate that a leak has occurred in the refrigeration system and is operating outside of its operating limits.

In addition to one or more of the features described herein, or as an alternative, further embodiments include evacuating the refrigeration system if the sensor detects a leak above an evacuation threshold value and the low charge diagnostics calculations indicate that the refrigeration system is operating within its limits.

In addition to one or more of the features described herein, or as an alternative, further embodiments include performing a recheck after servicing or replacing the sensor and if the sensor is providing a sensor alarm, provide an additional sensor alarm to indicate the sensor requires service or repair.

In addition to one or more of the features described herein, or as an alternative, further embodiments include a refrigeration system that is a transport refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features and advantages of embodiments are apparent from the following detailed description taken in conjunction with the accompanying drawings in which.

DETAILED DESCRIPTION

The techniques described herein provide for testing proper sensor functionality before performing the diagnostics for the system. In addition, the techniques described herein provides for verifying that there is no refrigerant leak present in the transport refrigeration unit prior to departure. The techniques described herein include performing a loss of charge diagnostic calculations to be used in conjunction with the refrigerant leak sensor to perform additional trouble shooting measures. This adds the capability to ensure the sensor(s) are functioning properly, and to identify potential false alarms that may occur in the system.

Figure 1:
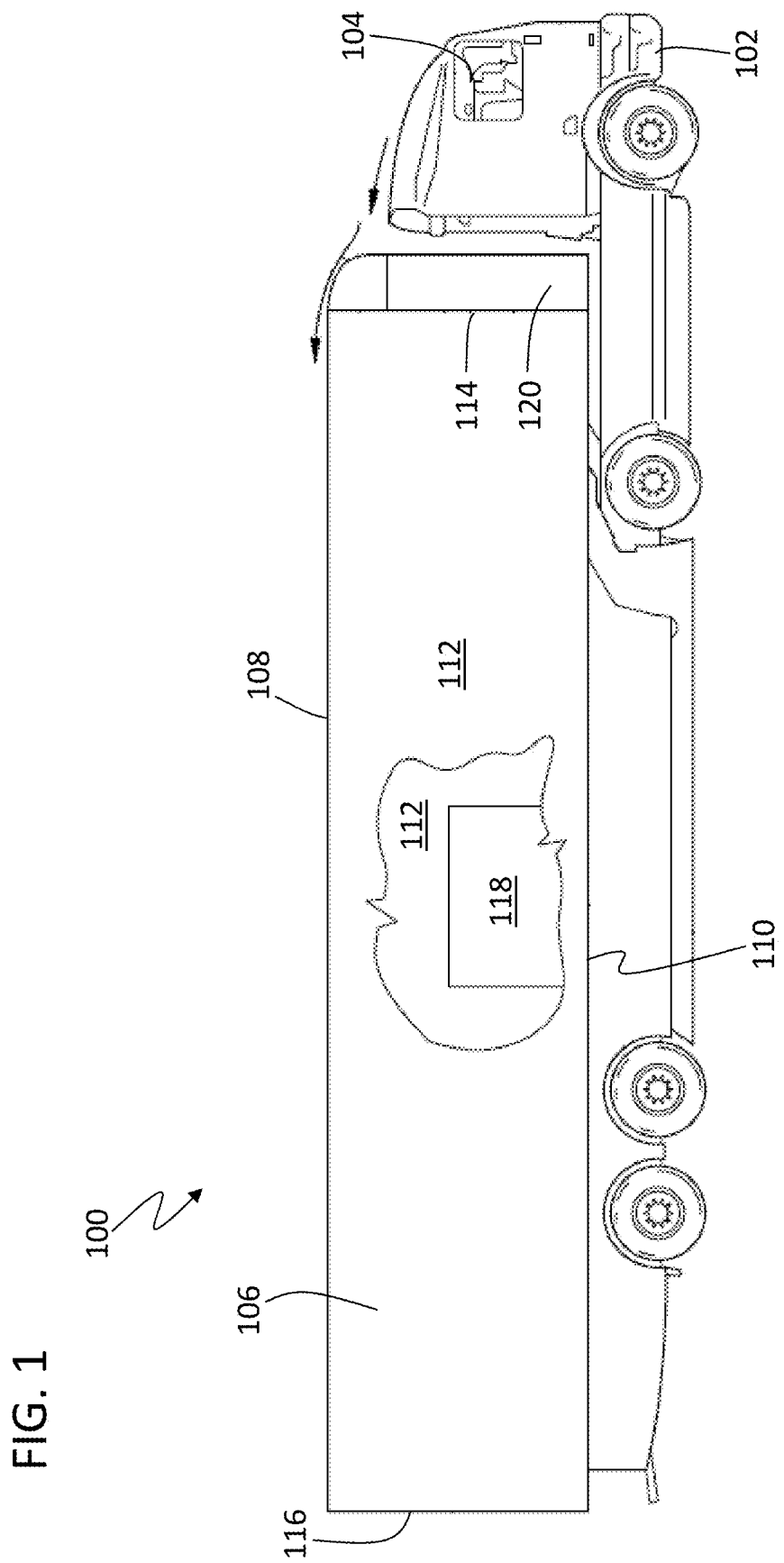
FIG. 1 depicts a tractor trailer system having a transport refrigeration unit and a cargo compartment in an exemplary embodiment.

Shown in FIG. 1 is an embodiment of a tractor trailer system 100. The tractor trailer system 100 includes a tractor 102 including an operator's compartment or cab 104 and also including an engine, which acts as the drive system of the tractor trailer system 100. A trailer 106 is coupled to the tractor 102. The trailer 106 is a refrigerated trailer 106 and includes a top wall 108, a directly opposed bottom wall 110, opposed side walls 112, and a front wall 114, with the front wall 114 being closest to the tractor 102. The trailer 106 further includes a door or doors (not shown) at a rear wall 116, opposite the front wall 114. The walls of the trailer 106 define a cargo compartment. The trailer 106 is configured to maintain a cargo 118 located inside the cargo compartment at a selected temperature through the use of a transport refrigeration unit 120 located on the trailer 106. The transport refrigeration unit 120, as shown in FIG. 1, is located at or attached to the front wall 114.

Figure 2:
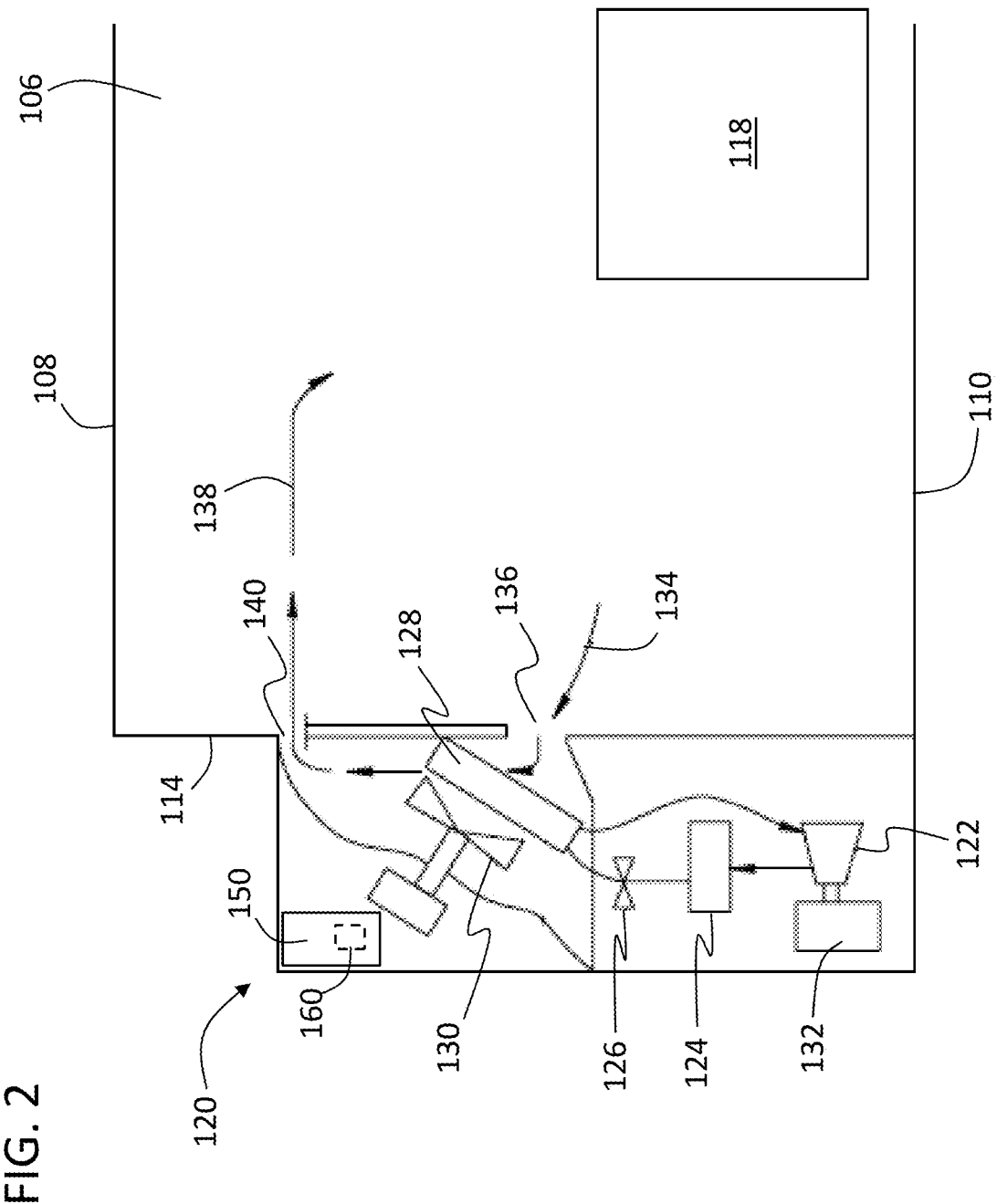
FIG. 2 depicts a transport refrigeration unit for a cargo compartment of the tractor trailer system of FIG. 1 in an exemplary embodiment.

Referring now to FIG. 2, the transport refrigeration unit 120 is shown in more detail. The transport refrigeration unit 120 includes a compressor 122, a condenser 124, an expansion valve 126, an evaporator 128, and an evaporator fan 130. The compressor 122 is operably connected to a AC power source 132 which drives the compressor 122. Airflow is circulated into and through the cargo compartment of the trailer 106 by means of the transport refrigeration unit 120. A return airflow 134 flows into the transport refrigeration unit 120 from the cargo compartment of the trailer 106 through a refrigeration unit inlet 136, and across the evaporator 128 via the evaporator fan 130, thus cooling the return airflow 134. The cooled return airflow 134, now referred to as supply airflow 138, is supplied into the cargo compartment of the trailer 106 through a refrigeration unit outlet 140, which in some embodiments is located near the top wall 108 of the trailer 106. The supply airflow 138 cools the cargo 118 in the cargo compartment of the trailer 106. Also included in the cargo compartment is the refrigerant leak sensor 150 which is used to detect the leak of a particular type of refrigerant or substance. It is to be understood that the refrigerant leak sensor 150 can be located in different locations in the system and is not limited by the example shown in FIG. 2. For example, the refrigerant leak sensor 150 can be located in the evaporator section of the transport refrigeration unit 120, a different portion of the cargo compartment of the trailer 106, or other location in the system. Upon detection by the refrigerant leak sensor 150, a signal can be transmitted to the controller 160. A controller 160 controls various aspects of the transport refrigeration unit 120 and the transport refrigeration unit power system. The controller 160 can control the compressor 122, the condenser 124, the expansion valve 126, the evaporator 128, and the evaporator fan 130 in addiction to other equipment or sensors. The controller 160 can be connected to the equipment over a wired or wireless connection (connections not shown). The controller 160 can be configured to perform a low charge diagnostics calculation which is used to perform various calculations of the refrigeration system of the transport refrigeration unit 120 to determine a state of operation. In other embodiments, the low charge diagnostics calculation can be performed in a cloud network (not shown in FIG. 2).

Figure 3:
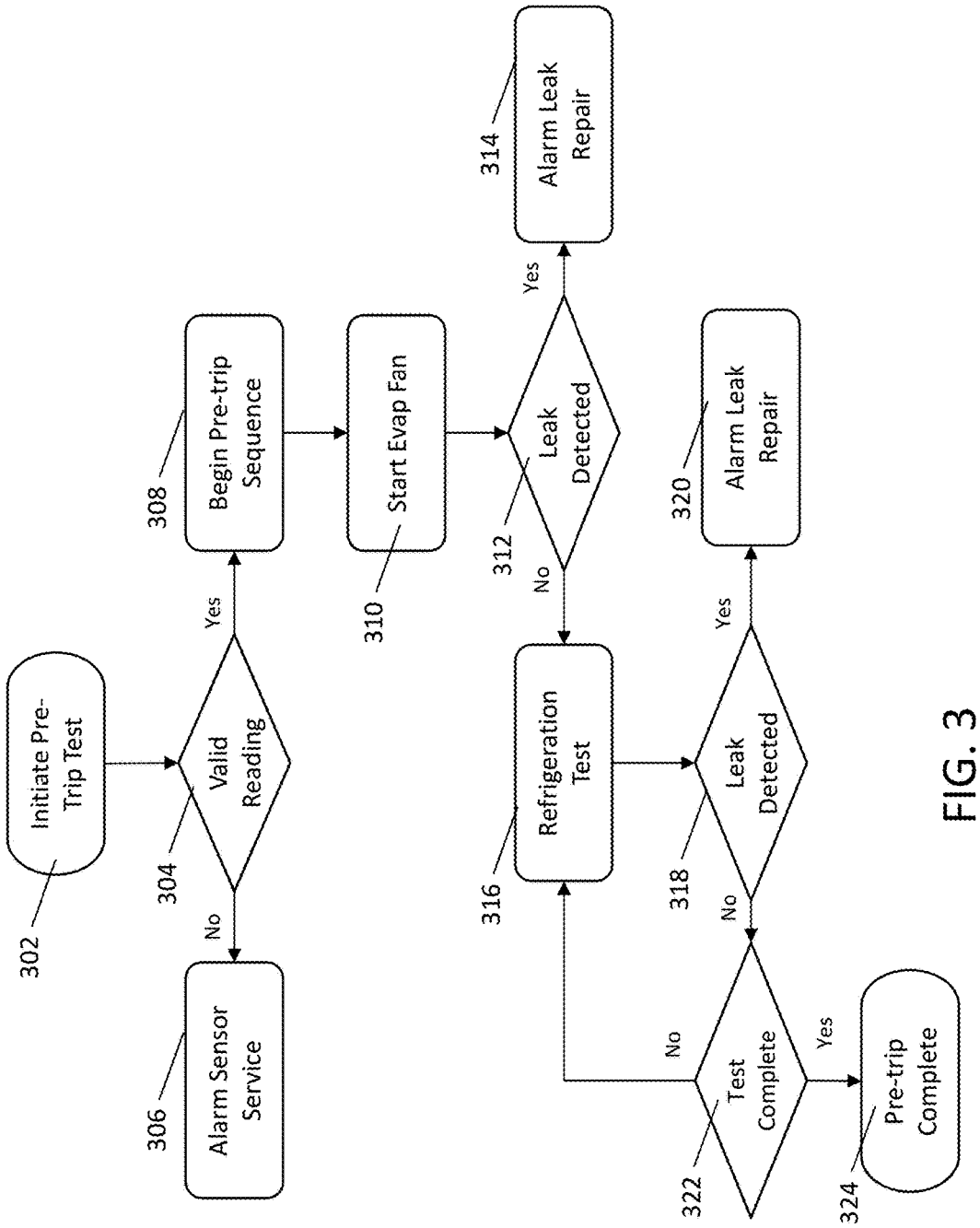
FIG. 3 depicts a flowchart of a method for validating a leak sensor operation in accordance with one or more embodiments.

FIG. 3 depicts a flowchart of a method 300 for validating the refrigerant leak sensor 150 operation in accordance with one or more embodiments. The pre-trip test and sequence ensures the refrigeration system is fully operational prior to the transport refrigeration unit departure from its current location. The pre-trip test includes a test to validate the functionality of the refrigerant leak sensor 150. The pre-trip test is performed by sending a signal to the refrigerant leak sensor 150 from the controller 160 and reading the received signal from the refrigerant leak sensor. Based on the response, the controller 160 can determine whether or not a valid reading was received indicating the operability of the refrigerant leak sensor.

The method 300 begins at block 302 to initiate a pre-trip test and proceeds to block 304 to validate the operation of a sensor such as the refrigerant leak sensor 150. In a non-limiting example, the controller 160 performs the test by sending a signal to the sensor to test the operation of the sensor. The controller 160 receives a signal from the sensor indicating a current reading of the sensor. In a non-limiting example, sensors can provide an expected output and operate within an expected range (i.e. 0.25-4.75 Volts DC) under normal operating conditions. When such a sensor fails, the failing conditions can cause the sensors to provide a reading that is outside of the expected range indicating a bad or failed sensor. For example, a sensor having a faulty connection or broken wire can create an open circuit providing a 5 VDC reading to the controller 160. In another example, if moisture ingresses into the sensor it would create a short circuit providing a 0 VDC reading indicating a bad sensor. The validation test is not limited to testing the leak sensor, but can also be applied to other sensors and equipment in the system which can be verified during the pre-trip test. This provides a higher reliability in the obtained sensor readings.

If a valid sensor reading is not received by the controller 160, the method 300 continues to block 306 ("No" branch)

where a sensor service alarm can be provided to alert an operator or administrator of an issue. The sensor service alarm can indicate that the sensor itself is not functioning properly. The sensor service can include repairing the sensor or replacing the sensor. If a valid sensor reading is received by the controller 160, then the method 300 proceeds to block 308 ("Yes" branch) where the pre-trip sequence begins.

The operational pre-trip sequence begins with testing the evaporator fan 130 to move air within the cargo compartment and sense whether a leak is present. In some embodiments, the evaporator fan 130 is operated. If there are no issues detected, the vapor compression cooling and heating portion of the test begins. The refrigerant leak sensor 150 is continually monitored during operation to determine if a leak is present. If a leak is indicated, action can be taken to remedy the issue. In some embodiments, the evaporator fan can be tested and operated along with the refrigeration test.

At block 310, an evaporator fan 130 of the system is started. This allows the airflow to circulate in the environment or cargo compartment to allow the refrigerant leak sensor 150 the opportunity to detect if any leaks are present. That is, if a small amount of refrigerant has leaked in the cargo compartment, the evaporator fan 130 can circulate the airflow through the space so the refrigerant leak sensor 150 can detect the leak.

If the refrigerant leak sensor 150 detects a leak at block 312, a signal can be provided to the controller 150 to indicate the presence of the leak. The method 300 can then continue to block 314 ("Yes" branch) where a leak repair alarm is provided to an operator or administrator. If the refrigerant leak sensor 150 does not detect a leak at block 312 the method 300 continues to block 316 ("No" branch) and performs a refrigeration system test. This can include operating the compressor and other components to circulate refrigerant through the system.

During the refrigeration system test at block 316, the refrigerant leak sensor 150 continues to monitor for the presence of a leak in the monitored area as shown in block 318. If the refrigerant leak sensor 150 detects a leak, a signal can be provided to the controller 160 and indicate a leak repair alarm as shown at block 320 ("Yes" branch). If the refrigerant leak sensor 150 does not detect a leak, the process continues to block 322 to determine if the refrigeration test is complete ("No" branch). If the test is not completed, the method 300 returns to block 316 to continue testing the remaining components of the refrigeration system ("No" branch). Otherwise, in the event the refrigeration test is completed ("Yes" branch), the pre-trip sequence is completed and ends at block 324. It should be understood the method 300 can be repeated whenever the system is initially powered on and started or when manually initiated by an operator or administrator.

Figure 4:
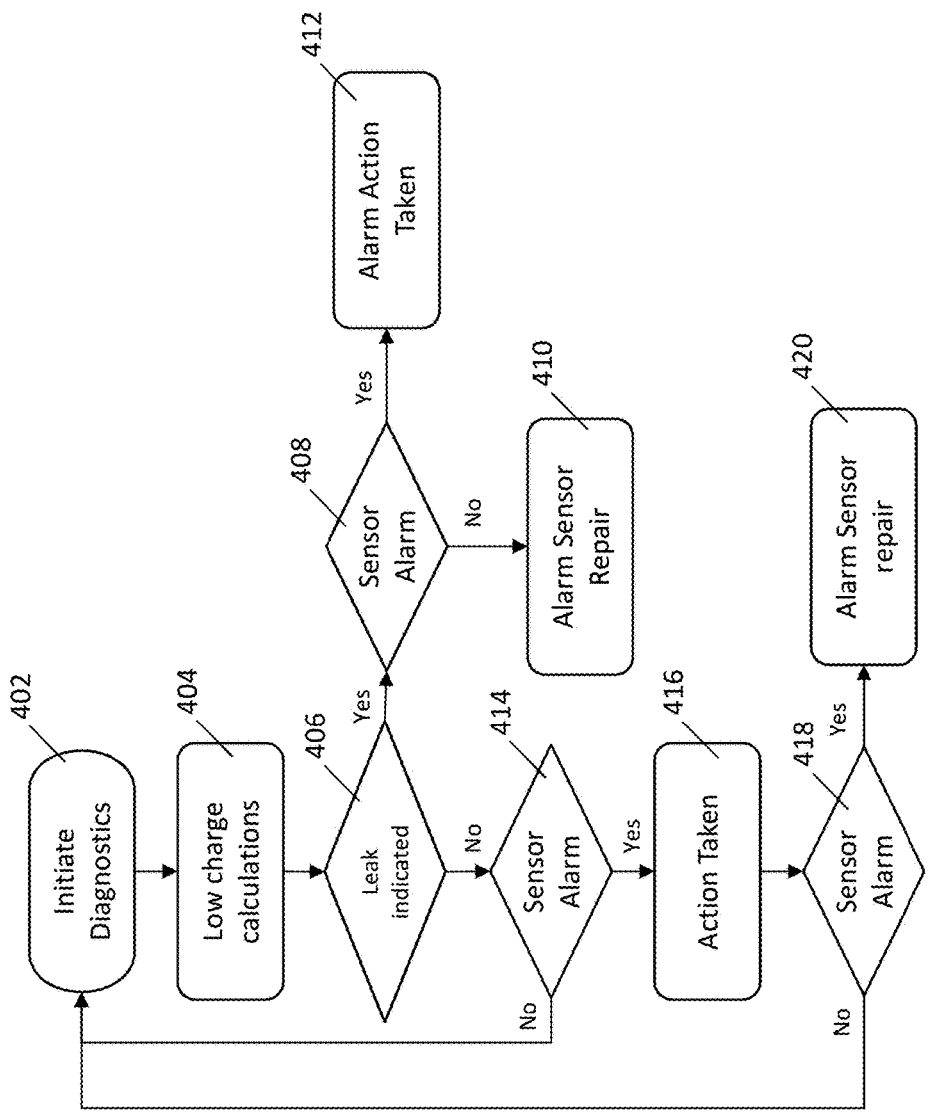
FIG. 4 depicts a flowchart of a method for performing a diagnostics for the transport refrigeration unit in accordance with one or more embodiments.

In one or more embodiments, after performing the pre-trip test and sequence described by the method 300, diagnostics can be run continually or periodically to monitor for the presence of a leak in the cargo compartment as shown in FIG. 4. The diagnostics include calculating refrigerant low charge diagnostics which can be used to aid in identifying a potential false refrigerant sensor alarm.

At block 402, the method 400 for performing system diagnostics including refrigerant leak sensor diagnostics is initiated. In one or more embodiments, the diagnostics are performed to test the operability of the refrigeration system and its components. At block 404 the diagnostics can include performing low charge diagnostics calculations in the controller 160 or system using data that is obtained from various inputs, sensors, and other sources. In some embodiments, the low charge diagnostics calculations can be performed in a cloud based system. Baseline system operating parameters are defined according to the unit operation conditions, such as but not limited to, ambient temperature, box temperature, engine speed or standby power level, compressor loading, and control valve position. A relationship between these parameters is pre-defined in the diagnostics calculations to quantify the expected nominal system operation conditions, such as acceptable pressure, temperature, control valve positions, and electrical current values. In one or more embodiments, these measurements are taken by on-board instrumentation on the unit. If measurements of these parameters fall outside of the pre-defined acceptable range, diagnostic checks can indicate that a leak has occurred.

In some embodiments, the calculations can be compared to the readings and measurements from the sensors in the field that are monitoring the system. For example, the calculations can indicate if a low charge state exists and if so, compare the current status obtained by the sensor. If a low charge exists and the sensor is providing an alarm, the sensor is operating properly. However, if a low charge exists and the sensor is not providing an alarm, a faulty sensor or operating range may be configured for the sensor.

Also if a normal charge is provided and an alarm is provided by the sensor, the sensor may be a faulty sensor requiring service or replacement. The charge calculations can factor the volume, pressure and temperature related to the refrigerant and refrigerant system to determine the current state.

In some embodiments, if there is a refrigerant alarm indicating a high refrigerant level during the operational pre-trip sequence, but the diagnostics indicate that the system is operating within its normal limits, a potential false alarm may be present. In such a case, an extended operation test is conducted to monitor the refrigerant level, as well as the diagnostics calculations. If after a pre-set duration the sensed refrigerant level is still high, or rising, but the diagnostics indicate that the charge level is steady, an alarm indicator is sent indicating that service or further evaluation of the refrigerant leak sensor 150 is required. The diagnostic calculations and sensor readings can be used to provide various levels of information to mitigate the malfunctioning system or detection of a leak in the cargo compartment.

At block 406, it is determined whether the low charge calculations indicate a leak. If so ("Yes" branch), the method 400 continues to block 408 to determine whether the refrigerant leak sensor 150 has detected a leak consistent with the low charge calculations. If the refrigerant leak sensor 150 has not indicated a sensor alarm at block 408, the method 400 continues to block 410 ("No" branch) and provides an alarm sensor repair. However, if at block 408 the refrigerant leak sensor 150 does indicate a sensor alarm, the method 400 proceeds to block 412 ("Yes" branch) indicating an alarm that action should be taken to address the issue. Action can be taken such as but not limited to sending an alarm, exhaust of the refrigerated space, shutting the system down, or other actions can be taken.

Returning to block 406, if the low charge calculations do not indicate a leak, the method 400 continues to block 414 ("No" branch) to determine whether the refrigerant leak sensor 150 has provided a sensor alarm. If at block 414 it is determined that a sensor alarm has been provided, the method 400 continues to block 416 ("Yes" branch) to provide a take action alarm. Next, the method 400 advances to block 418 to recheck if the leak sensor is still indicating a sensor alarm. If so ("Yes" branch), a repair sensor alarm can be provided as shown in block 420 because the issue remains even after servicing or replacing the leak sensor. Otherwise ("No" branch), the method continues to block 402 to continue the diagnostics. Otherwise, if no sensor alarm is indicated by the refrigerant leak sensor 150 at block 414 the method 400 returns to block 402 ("No" branch) and continues to perform the diagnostics and leak monitoring for the refrigeration system.

In some embodiments, if a large leak is detected by the refrigerant leak sensor 150, but the diagnostics indicate the refrigeration system is operating within its operational limits, a system evacuation can be performed. The large leak can be determined by using a configurable threshold. Following the system evacuation, if the refrigerant alarm still indicates the refrigerant leak remains present, the operational diagnostics can be utilized to determine whether a potential false alarm has occurred.

The technical effects and benefits include improved safety by ensuring sensor functionality prior to each trip. The technical effects and benefits include improved troubleshooting by identifying various sensor faults resulting in less product downtime. In addition, low charge diagnostics calculations are used to preempt a system shutdown, or by identifying a non-functional sensors in the system.

While the disclosure has been provided in detail in connection with only a limited number of embodiments, it should be readily understood that the present disclosure is not limited to such disclosed embodiments. Rather, embodiments can be modified to incorporate any number of variations, alterations, substitutions, combination, sub-combination, or equivalent arrangements not heretofore described, but which are commensurate with the spirit and scope of the disclosure. Additionally, while various embodiments have been described, it is to be understood that aspects of the disclosure may include only some of the described embodiments. Accordingly, embodiments are not to be seen as limited by the foregoing description, but only limited by the scope of the appended claims.

What is claimed is:

1. A system comprising:
a sensor;
an evaporator fan;
a controller, wherein the controller is configured to:
   validate an operation of the sensor;
   operate the evaporator fan based at least in part on validating the operation of the sensor;
   responsive to operating the evaporator fan, determine if a refrigerant leak is present using the sensor;
   perform a refrigeration test of a refrigeration system, wherein the refrigeration test comprises operating a compressor to circulate refrigerant through the refrigeration system;
   determine if a refrigerant leak is present using the sensor; and
   provide an alarm based at least in part on determining the refrigerant leak is present.

2. The system of claim 1, wherein the refrigeration system further includes a condenser.

3. The system of claim 2, wherein the refrigeration system is a transport refrigeration unit.

4. The system of claim 1, wherein the sensor is a refrigerant leak sensor.

5. A method for performing pre-trip sequence and diagnostics for a leak sensor, the method comprising:
validating an operation of a sensor;
operating an evaporator fan based at least in part on validating the operation of the sensor;
responsive to operating the evaporator fan, determining if a refrigerant leak is present using the sensor;
performing a refrigeration test of a refrigeration system, wherein the refrigeration test comprises operating a compressor to circulate refrigerant through the refrigeration system;
determining if a refrigerant leak is present using the sensor; and
providing an alarm based at least in part on determining the refrigerant leak is present.

6. The method of claim 5, wherein validating the sensor comprises sending, by the controller, a signal to the sensor; and
receiving a reading from the sensor.

7. The method of claim 6, wherein if validating the sensor fails, providing a sensor service alarm to indicate the sensor requires servicing.

8. The method of claim 5, wherein the sensor is refrigerant leak sensor.

9. The method of claim 5, wherein the evaporator fan is operated prior to performing the refrigeration test.

10. The method of claim 5, wherein the evaporator fan is operated with the refrigeration test.

11. The method of claim 5, wherein the refrigeration test comprises operating one or more components of the refrigeration system to test for component failures; and
testing for a presence of a refrigerant leak.

12. The method of claim 5, further comprising initiating diagnostics for the sensor including calculating low charge diagnostics for the refrigeration system.

13. The method of claim 12, further comprising comparing the low charge diagnostics calculations with the measured values from other sensors in the refrigeration system; and
comparing results of the low charge diagnostics calculations with a state of the sensor.

14. The method of claim 13, further comprising determining a potential false alarm exists based on comparing the low charge diagnostics calculations and measurements obtained from the sensor.

15. The method of claim 14, wherein the potential false alarm exists when the sensor indicates a sensor alarm and the low charge diagnostics calculations indicate the refrigeration system is operating within its operational limits.

16. The method of claim 13, further comprising determining a faulty sensor exists when the sensor has not indicated a sensor alarm and the low charge diagnostics calculations indicate that a refrigerant leak has occurred in the refrigeration system and is operating outside of its operating limits.

17. The method of claim 13, further comprising evacuating the refrigeration system if the sensor detects a refrigerant leak above an evacuation threshold value and the low charge diagnostics calculations indicate that the refrigeration system is operating within its limits.

18. The method of claim 17, further comprising performing a recheck after servicing or replacing the sensor;
if the sensor is providing a sensor alarm, provide an additional sensor alarm to indicate the sensor requires service or repair.

19. The method of claim 5, wherein the refrigeration system is a transport refrigeration unit.

* * * * *